Figure 1:

Dec. 15, 1959   E. T. ROSENBERG   2,917,517
DIPHOSPHOIMIDAZOLES
Filed June 13, 1957   2 Sheets-Sheet 1

Ethanolamine   α-Alanine

Ernest T. Rosenberg
Inventor
By Sol Shappirio
Attorney

Dec. 15, 1959 E. T. ROSENBERG 2,917,517
DIPHOSPHOIMIDAZOLES
Filed June 13, 1957 2 Sheets-Sheet 2

| Free | Reaction | Isolated | Free | Reaction | Isolated |
| amine | mixture | phospho- | amine | mixture | phospho- |
| | | rylated | | | rylated |
| | | amine | | | amine |

β-Alanine         Serine

Ernst Thomas Rosenberg
aplicant
By Sol Shappirio
attorney 2,917,517
Patented Dec. 15, 1959

2,917,517

DIPHOSPHOIMIDAZOLES

Ernst Thomas Rosenberg, Orholm pr. Lyngby, Denmark, assignor to Aktiebolaget Leo, Halsengborg, Sweden Application June 13, 1957, Serial No. 665,430

Claims priority, application Denmark June 16, 1956

5 Claims. (Cl. 260—309)

The use of various compounds derived from phosphoric acid, particularly chlorine compounds, such as phosphorus oxychloride, thiophosphoryl chloride, phenyl phosphoryl-dichloride and diphenyl phosphorus oxychloride, as phosphorylating agents in organic chemistry is known.

The use of the said compounds for the introduction of the phosphoryl group as a substituent in one or more amino groups in organic nitrogenous bases, however, presents various disadvantages. Thus, the said phosphorylating agents attack with partiality groups in the molecule other than the amino groups, for example hydroxy or carboxyl groups as well as double bonds, and accordingly, if it is desired that the phosphorylation shall take place at the amino groups only it is necessary to protect the said groups during the phosphorylation and then re-establish them when the desired phosphorylation has taken place. Such a method may be difficult or impossible to carry through, and in any event involves costs and losses. Moreover, the said phosphorylating agents are violent acting reagents with which often a controlled reaction can only be carried through incompletely. Thus, phosphorylating agents, containing more than one halogen atom are liable to esterify with more than one nitrogen-containing group per phosphorus atom. If this is undesired, therefore, di-esterified phosphorus oxychloride is used as the phosphorylating agent, such as the said dibenzyl phosphorus oxychloride, but then the benzyl groups have to be split off after the phosphorylation, for instance by saponification or catalytic reduction, whereby it may be difficult or in certain circumstances impossible to prevent the phosphorylation from reversing, or that other undesired changes in the phosphorylation product take place. Moreover, the known phosphorylating agents generally demand that the reaction be carried out in an anhydrous and hydroxyl-free medium, because with water or alcohol an often momentary hydrolysis or alcoholysis takes place.

Primarily, the present invention has for its object a method for the phosphorylation of organic nitrogenous bases at one or more amino groups, particularly primary or secondary amino groups or imino groups, regardless of whether the said nitrogenous bases contain other reactive groups, such as hydroxy or carboxyl groups or double bonds, that are not desired to be attacked. Avoiding the said disadvantages, this may be obtained according to the invention by reacting the base in question with 1,3-diphosphoimidazoles in an aqueous medium at alkaline reaction, and at a temperature below 100° C., preferably at room temperature.

The said 1,3-diphosphoimidazoles, which are hitherto unknown compounds, may be illustrated by the formula:

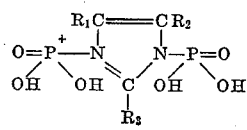

The substituents $R_1$, $R_2$ and $R_3$ at the carbon atoms are preferably hydrogen atoms, but, for instance, one may be —$CH_2CH(NH_2)COOH$ as in the case of histidine phosphate, which may be used according to the invention, or —$CH_2CH_2NH_2$, as in the case of histamine, the phosphoric acid compound of which may also be used. However, it has been found that such unsymmetrical imidazoles are less suited than imidazole itself or a symmetrically substituted imidazole, such as for instance 1,3-diphospho-4,5-dimethyl imidazole, since the phosphoryl group (it is always only one of the phosphoryl groups present which is surrendered to the amine to be phosphorylated) is less easily removable.

Since the 1,3-diphosphoimidazoles as described are hitherto unknown compounds, the invention also has for its object agents for the phosphorylation of organic nitrogenous bases, which agents consist of or contain 1,3-diphosphoimidazoles as an active component.

The novel phosphoimidazoles may be produced, according to the invention, by reacting aminophosphoric acid in the form of its salts with imidazoles in aqueous solution.

At neutral reaction, the bond between phosphorus and a nitrogen atom in the imidazole ring will be hydrolyzed in all examined 1,3-diphosphoimidazoles and also in monophosphoimidazoles. In alkaline solution, the monophosphates are stable up to 100° C., whereas the hydrolysis of the diphosphates proceeds more rapidly at alkaline than at neutral reaction, as can be shown by chromatographic examinations. At a pH of about 12 and at 100° C., the hydrolysis of diphosphoimidazole is completed in 10–15 minutes. Analogously when a nitrogenous base is present, a phosphoryl group will be surrendered thereto so that the diphosphoimidazole will be transformed into a monophosphoimidazole in accordance with the following reaction scheme:

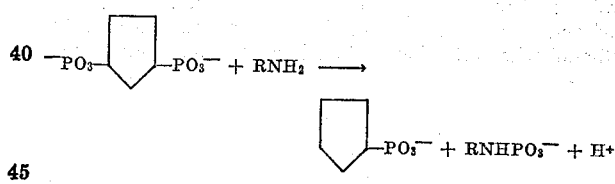

the reaction between 1,3-diphosphoimidazole and a primary amine at alkaline reaction being used as an example.

The phosphorylation method according to the invention has proved particularly suitable for the phosphorylation of primary aliphatic amines, but may also be used for the phosphorylation of imines and aromatic amines. The presence of reactive groups other than the amino group or groups, which it is desired to phosphorylate, has proved without importance in all investigated cases, since these groups are not attacked. Therefore, the method is well suited for the phosphorylation of amino acids, peptides, and controlled phosphorylation of a number of amino groups in proteins. The method may also be used for the phosphorylation of certain substances of basic reaction occurring in nature, or of the primary amino groups in such.

Figure 2:
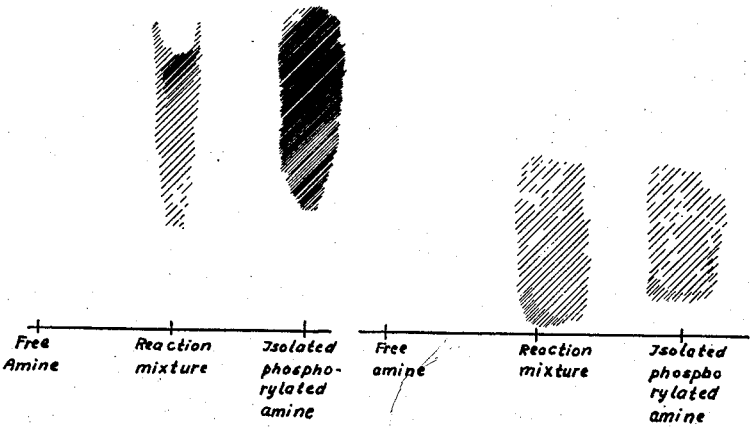
Figure 3:
Figure 4:

In the following, the invention will be illustrated by a number of examples, in part with reference to the accompanying drawings, in which Figs. 1–4 show paper chromatograms with three spots, e.g. the free amine, the mixture with 1,3-diphosphoimidazole, and the isolated phosphorylated amine, whereby Fig. 1 shows chromatograms with ethanol amine,
Fig. 2 with alpha-alanine
Fig. 3 with beta-alanine, and
Fig. 4 with serine.

Example 1

The following phosphorylation method may be used practically identical for various amines:

1 millimole of the calcium salt of 1,3-diphosphoimidazole is stirred in a mortar with 10 ccs. of a 6% solution of sodium carbonate. After filtration, one millimole of the amine is dissolved in the filtrate. The solution is left standing at room temperature for about 20 hours. Under these conditions, about 20–50% of the amine will generally be phosphorylated. The isolation of the phosphorylated amines is generally carried out by fractional precipitation of the calcium or barium salts. In some cases a perfect separation from mono and diphosphoimidazole cannot be obtained in this manner. If the phosphorylated compound is sufficiently high-molecular, however, the removal of the said substance may be carried out by dialysis.

In all cases, the drawings clearly show that a phosphorylated compound has been formed.

Similar experiments have been carried out with substantially similar results on the following amines: glucosamine, tyrosine, tryptophan, histidine and proline, and with a somewhat smaller yield on the aromatic amines: p-aminobenzoic acid and sulphanilic acid. Creatine may also be phosphorylated according to the invention if pH is raised to 13–14. Generally, the pH of the reaction medium should preferably not be more than one or two units lower than the pK of the amine (acid pK, i.e. the negative logarithm of $$K = \frac{C_N \cdot C_{H^+}}{C_{NH^+}}$$

Example 2

The preparation of 1,3-diphosphoimidazole may be carried out in the following manner:

10 g. of the potassium salt of aminophosphoric acid and 2.5 g. of imidazole are dissolved in 100 ccs. of water, whereafter pH is adjusted to 7.2. The mixture is left for 10–20 hours at room temperature. Then, 17 g. of calcium chloride (CaCl$_2$, 6H$_2$O) dissolved in a small volume of water are added, and the precipitate is filtered off and discarded. To the filtrate are added 5 ccs. of ethanol whereafter inoculation is carried out with an inoculation sample which may be prepared by stirring a small part of the filtrate with an equal volume of ethanol. After about one hour, the crystals are filtered off, washed with water, ethanol or ether, and dried in air. Yield: 5.7 g. of 1,3-diphosphoimidazole. A further fraction may be obtained from the filtrate by adding 20 ccs. of ethanol. Yield: 2.6 g.

What I claim is:

1. A compound selected from the class consisting of diphosphoimidazoles of the formula

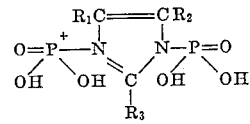

and calcium salts thereof wherein R$_1$, R$_2$ and R$_3$ are selected from the group consisting of hydrogen atoms, methyl groups, the group —CH$_2$CH$_2$NH$_2$ and the group —CH$_2$CH(NH$_2$)COOH.

2. 1,3-diphosphoimidazole having the formula:

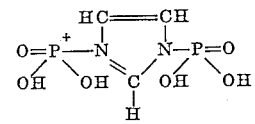

3. 1,3-diphospho-4,5-dimethyl imidazole having the formula:

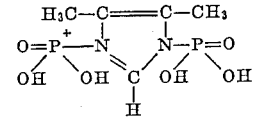

4. Method for production of the diphosphoimidazoles of claim 1, in which the corresponding imidazole is reacted with aminophosphoric acid in neutral to alkaline solution.

5. The calcium salt of diphosphoimidazole.

References Cited in the file of this patent

Wagner-Jauregg et al.: J. Am. Chem. Soc., vol. 75, pp. 2125–2130 (1953).